United States Patent [19]

Stearns

[11] 4,169,633
[45] Oct. 2, 1979

[54] MULTI-FUNCTION PARKING BRAKE CONTROL VALVE WITH SEPARATED SUPPLY AND CONTROL INPUTS

[75] Inventor: George Stearns, Florissant, Mo.

[73] Assignee: Wagner Electric Corporation, St. Louis, Mo.

[21] Appl. No.: 905,962

[22] Filed: May 15, 1978

[51] Int. Cl.² ............................................... B60T 13/28
[52] U.S. Cl. ..................................... 303/7; 303/6 M; 303/9
[58] Field of Search ................ 303/6 R, 6 M, 7, 9, 303/13, 18, 29, 50, 71, 84 R, 84 A

[56] References Cited

U.S. PATENT DOCUMENTS

| 3,992,064 | 11/1976 | Carton et al. | 303/7 |
| 4,017,125 | 4/1977 | Durling | 303/7 |
| 4,058,345 | 11/1977 | Klimek | 303/6 M |
| 4,080,004 | 3/1978 | Ury | 303/9 |

Primary Examiner—Duane A. Reger
Attorney, Agent, or Firm—Eyre, Mann, Lucas & Just

[57] ABSTRACT

Separate inputs for air pressure supply and parking brake control are provided to a parking brake control valve for a towed vehicle to enable manual release of the parking brakes using air pressure stored in either one of two mutually protected reservoirs on the towed vehicle without bleeding one source of stored air pressure into another.

15 Claims, 7 Drawing Figures

MULTI-FUNCTION PARKING BRAKE CONTROL VALVE WITH SEPARATED SUPPLY AND CONTROL INPUTS

BACKGROUND OF THE INVENTION

In the modern highway vehicles of the tractor and semi-trailer type, one or more air pressure reservoirs are employed on the trailer to supply air pressure to maintain spring-applied air-released parking brakes in the released condition. Control of the stored air is provided by a supply air conduit from the tractor which both maintains the trailer pressure reservoirs in the pressurized condition and also acts through an amplifying relay valve to connect the air pressure from at least one of the air pressure reservoirs to the parking brakes. When the supply conduit is vented, either by the vehicle operator operating a parking brake control in the cab, or by intentional or accidental disconnection of the air pressure lines between tractor and trailer, the amplifying relay valve vents the spring-set parking brakes on the trailer and thereby sets the parking brakes.

When a semi-trailer is parked in a parking area or when a vehicle malfunction has stranded the trailer on a road with the parking brakes set, it is frequently desirable to be able to release the trailer parking brakes using the air pressure stored on board. This would permit the trailer to be moved about a parking yard or moved out of a traffic area without the time and inconvenience to connect and pressurize the air pressure lines between the tractor and trailer.

In order to provide redundancy in actuation of the service brakes and the parking brakes, it is common practice to provide one or two service brake reservoirs for the control of service brakes and one emergency brake reservoir for the control of parking brakes.

Significant advances have been made in reducing the cost and weight of the braking systems by reducing the required number of air pressure reservoirs from four or three to two. In such systems, as typified by U.S. Pat. Nos. 3,992,064 and 4,042,281, two double-protected reservoirs are separately controllable to feed stored pressurized air to the vehicle service brakes and either or both pressure reservoirs are operative to supply air pressure for maintaining the parking brakes disengaged. Double protection of the reservoirs indicates that each reservoir is isolated from the other both at its input and its output and both are prevented from venting their stored air pressure back to the source.

The systems shown in U.S. Pat. Nos. 3,992,064 and 4,042,281 do not provide for manual control of the trailer parking brakes from the trailer. The problem arises because the control input to the relay valve is also connected through a pressure protection valve to the two reservoirs. In the event that one of the reservoirs is depleted, any air pressure attempted to be fed to the control input of the relay valve is bled off through the pressure protection valve into the depleted reservoir until the pressure tank having higher pressure is depleted until its air pressure is either equal to the depleted tank or is reduced to the pressure limit established by the pressure protection valve. Consequently, even though one of the two pressure tanks may contain more than enough air pressure to both operate the parking brakes and perform the control function, there is no way that this control can be performed.

SUMMARY OF THE INVENTION

The applicant has invented a system and a valve to implement the system which overcomes the difficulties of the prior art and permits the parking brakes of a trailer to be manually released using air stored on board the trailer without transferring air from one air pressure tank into a depleted air pressure tank.

In one embodiment, the applicant feeds air from each of two air pressure reservoirs through parallel check valves into a manual parking brake control. In order to avoid the cross transfer of air from a pressurized reservoir to a depleted reservoir, the applicant has separated the inputs to the relay valve so that the control input to the relay valve can be pressurized without feeding air pressure through the pressure protection valve to the air pressure reservoirs. Consequently, this embodiment permits the actuation of the relay valve which thereupon valves air pressure from the pressurized tank to the parking brakes.

In a second embodiment of the invention, the applicant has provided a unitary valve both for feeding the air pressure tanks and for double protecting the air pressure tanks and feeding air pressure from the air pressure tank with the higher air pressure to the input of the relay valve. An outlet from the unitary valve in pressure communication with an inlet to the relay valve feeds pressure from the higher of the two air pressure tanks to a manual control valve. The manually selectable output of the manual control valve is connected directly to the control input of the relay valve without being also connected to the inputs of the pressure reservoirs. Consequently, the higher of the two pressures in the pressure tanks is connected through the manual control valve to the control input of the relay valve. This permits parking brake release using the higher of the two pressures both for controlling the relay valve and for feeding forward to release the parking brakes.

DETAILED DESCRIPTION OF THE PREFERRED EMBODIMENT

Figure 1:
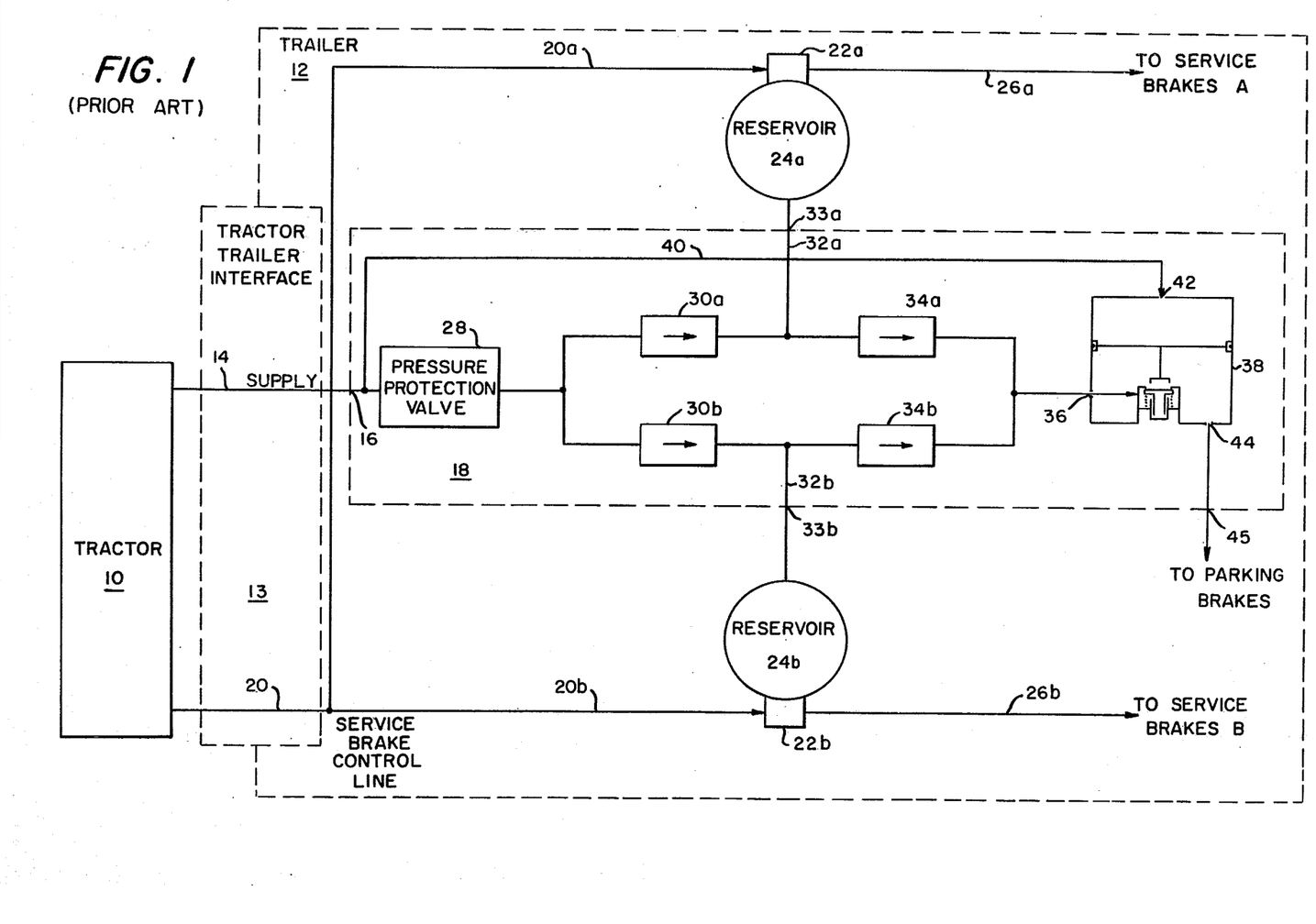
FIG. 1 shows a schematic diagram of a parking brake control system in the prior art.

Referring now to FIG. 1 there is shown a prior art system for feeding and controlling service and parking brakes in a towed vehicle. A tractor 10 is connected to a trailer 12 shown in dashed line through a tractor-trailer interface 13. The tractor-trailer interface 13 includes mechanical connection, such as a fifth wheel, and electrical connection with which the present invention is unconcerned. Consequently, these types of interface connections are omitted. The present invention is concerned with the connection of air pressure between the tractor 10 and the trailer 12. The tractor supply pressure is connected through supply conduit 14 to a supply inlet 16 of a valve portion 18.

The supply conduit 14 is pressurized usually to reservoir pressure from the tractor 12 customarily through a manually operated parking brake control, not shown. In order to release the parking brakes, the tractor 10 operator manipulates the manual parking brake control to apply air pressure to supply conduit 14, which results in the release of the parking brakes as will be explained. In order to apply the parking brakes, the tractor 10 operator manipulates the manual parking brake control to vent the supply conduit 14 which thereupon applies the parking brakes as will be explained.

A service brake control line 20 is also connected from the tractor 10 through the tractor-trailer interface 13 to the trailer 12. The service brake control line 20 is normally controlled by the tractor 10 operator manipulating a brake pedal or a hand controller to apply the trailer service brakes in proportion to the variable air pressure applied to service brake control line 20. The service brake control line 20 is normally maintained at about atmospheric pressure except when the service brakes are being applied. The pressure in service brake control line 20 is connected via branches 20a and 20b to skid control modulator valves 22a and 22b associated with reservoirs 24a and 24b respectively. Service brake lines 26a and 26b are connected between skid control modulator valves 22a and 22b respectively and their associated service brakes, not shown.

In normal operation, operator control of the air pressure in service brake control line 20 produces corresponding variations in pressure on service brake lines 26a and 26b.

The service brakes connected to service brake line 26a may be, for example, the front wheel set on a trailer bogy while the service brakes connected to service brake line 26b may be the rear wheels on the bogy. In the event of partial system failure in one set of service brakes or its associated reservoir, the other set of service brakes remains in operation to bring the vehicle to a safe and controlled stop. Such operation of service brakes using skid control modulator valves from two isolated reservoirs is well known in the art and does not constitute a part of the present invention.

The air pressure connected to supply inlet 16 of valve portion 18 under normal running conditions is in the range of from about 85 psi to 125 psi or higher. A pressure protection valve 28 receives the air pressure from supply input 16. Pressure protection valve 28 has the characteristic that it remains closed until a predetermined value of air pressure is available at its input, for example 50 psi, and thereafter fully opens to provide open fluid communication between its input and its output. Thus, when the system is initially being pressurized from the tractor 10, the pressure protection valve 28 prevents the air pressure from being depleted from the tractor until the tractor air pressure reaches the pressure protection valve pressure trigger point. This avoids drawing down the tractor pressure to zero during pressurization of the trailer system or in the event of a trailer brake or reservoir failure which void one or more reservoir.

As pressure is fed through pressure protection valve 28, it passes through inlet check valve 30a and branch passage 32a to pressurize reservoir 24a. At the same time, air pressure passes through inlet check valve 30b and branch passage 32b to pressurize reservoir 24b. Due to the polarization of the two inlet check valves 30a and 30b, air pressure stored in reservoir 24a is prevented from passing backward through the conduits into reservoir 24b or back to the tractor 10. Similarly, pressure stored in reservoir 24b is prevented from passing to reservoir 24a or back to the tractor 10.

Outlet check valve 34a is connected between reservoir 24a and the pressure inlet 36 of relay valve 38. Similarly, the pressure in reservoir 24b may pass through outlet check valve 34b to the pressure inlet 36 of relay valve 38. It would be clear to one skilled in the art, that the air pressure in only one of reservoir, 24a or 24b, whichever has the higher pressure, will be communicated through its respective outlet check valve, 34a or 34b, to the pressure inlet 36 of the relay valve 38. Consequently, the pressure inlet 36 of the relay valve 38 is constantly exposed to the higher of the two pressures available in reservoirs 24a and 24b. It would be further clear to one skilled in the art that, when one of reservoirs 24a and 24b has higher pressure therein feeding to pressure inlet 36, the check valve associated with the other reservoir prevents the retrograde flow of air pressure back into the other reservoir.

The air pressure at supply inlet 16 is also conducted via bypass passage 40 to the control inlet 42 of relay valve 38. Relay valve 38 is normally an amplifying relay valve of a type well known in the art and typified by the relay valve portion of U.S. Pat. No. 4,042,281 which permits a relatively low air pressure at control inlet 42 to control a relatively higher air pressure at pressure inlet 36. Consequently, in the event of partial temporary depletion of the supply air in supply conduit 14 from the tractor 10, the relay valve 38 is capable of continuing to supply high pressure to the parking brakes to maintain the parking brakes in the released condition. In the presence of sufficient air pressure at control inlet 42, the air pressure available at pressure inlet 36 is connected via parking brake outlet 44 and brake chamber port 45 to the parking brakes, not shown.

For the description which follows, it is assumed that one of the reservoirs, for example, reservoir 24b is partially or completely depleted due to a malfunction in the reservoir 24b or in the service brakes connected to service brake line 26b. Although full reservoir pressure may be available in reservoir 24a, there is no way that this pressure can be used to control relay valve 38 and to utilize the pressure in reservoir 24a to release the parking brakes. If, for example, the pressure in reservoir 24a at branch passage 32a is connected to supply inlet 16, the reservoir pressure in reservoir 24a passes through pressure protection valve 28 and check valve 30b to reservoir 24b where it is exhausted to the fault which initially exhausted reservoir 24b. This depletion of previously charged reservoir 24a continues until the cutoff pressure of pressure protection valve 28 is reached. The pressure remaining in reservoir 24a connected to pressure inlet 36 of relay valve 38 is insufficient to fully release the parking brakes. Consequently, the system shown in FIG. 1 is incapable of permitting full manual release of the parking brakes in the event of total or partial failure of the air system associated with one of the reservoirs even though full reservoir pressure is initially stored in the other reservoir.

Figure 2:
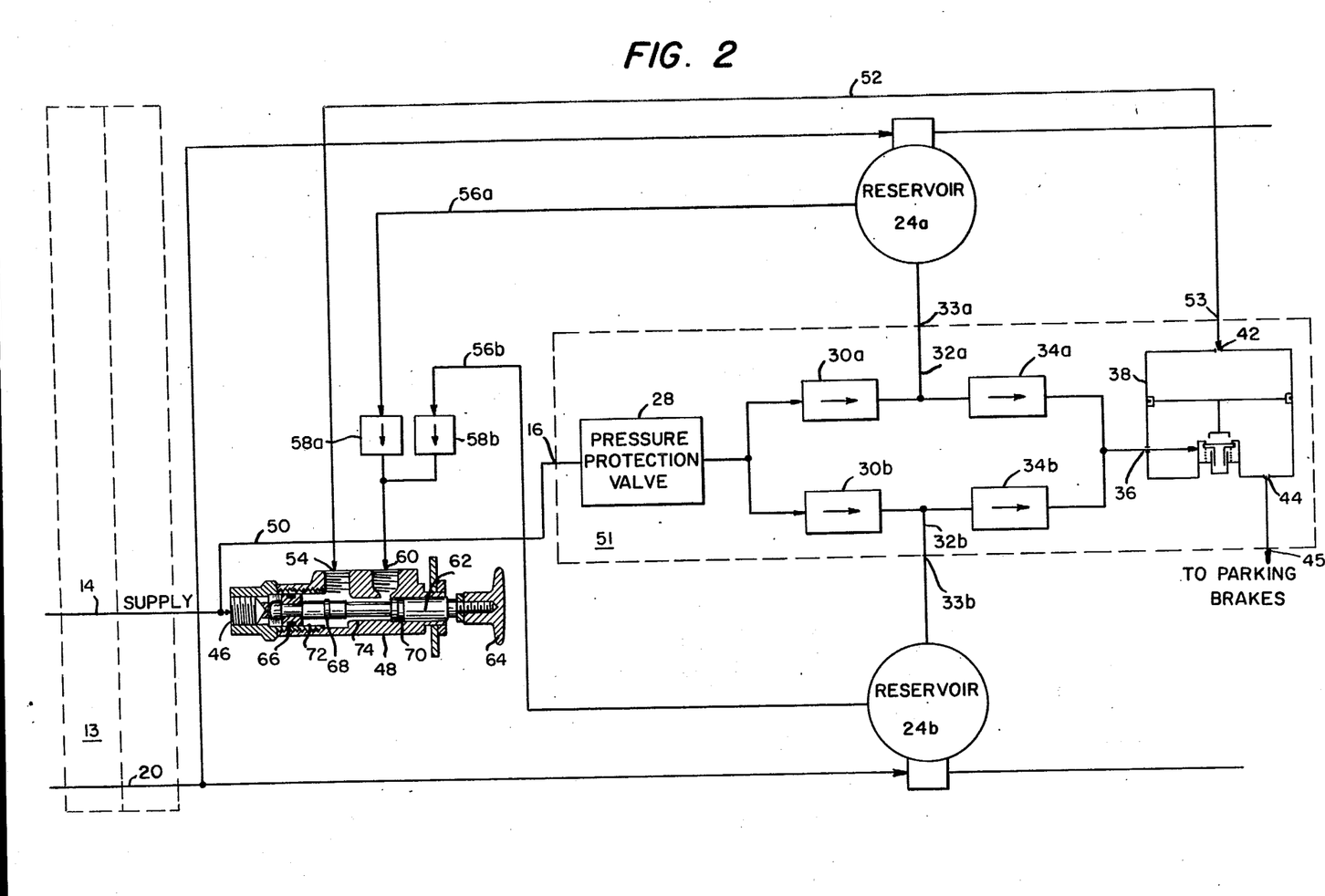
FIG. 2 shows a schematic diagram of a first embodiment of a brake control system according to the present invention.

FIG. 2 shows a system which overcomes the problems with the prior art and permits manual release of the parking brakes using air pressure stored in either reservoir 24a or 24b without depleting the higher pressure reservoir into the lower pressure reservoir.

The supply conduit 14 is connected to the supply inlet or connection 46 of a manual control valve 48. The supply conduit 14 is also connected by branch 50 to inlet 16 of the pressure protection valve 28 in valve portion 51. From pressure protection valve 28, reservoirs 24a and 24b are pressurized as previously explained. Note that the control line 52 to control connector 53 of valve portion 51 and thence to the control inlet 42 of relay valve 38 is separated from the branch 50 which is connected to the pressure protection valve 28. Control line 52 is connected directly to control outlet or connection 54 of manual control valve 48.

Stored pressure feedback lines 56a and 56b are connected from reservoirs 24a and 24b through check valves 58a and 58b to a feedback inlet or connection 60 of manual control valve 48.

Manual control valve 48 has a control shaft 62 manually displaceable by manipulation of a control knob 64. The control shaft 62 has three seals upon it, namely supply inlet seal 66, intermediate seal 68 and shaft seal 70. Supply inlet seal 66 is sized to sealingly fit an inlet bore 72 and thereby to seal supply inlet 46 from control line 52. When control knob 64 and control shaft 62 are moved fully rightward in the drawing, supply inlet seal 66 is withdrawn from inlet bore 72 and establishes pressure communication between supply inlet 46 and control line 52. When sufficient air pressure exists in supply conduit 14, this air pressure acting across the area of supply inlet seal 66 is effective to displace the control shaft and control knob rightward to establish air pressure communication with control line 52.

Intermediate seal 68 is sized for a sealing fit in intermediate bore 74 when the control shaft 62 is moved fully rightward in the drawing. When the control shaft 62 is drawn fully rightward, the intermediate seal 68 blocks communication between feedback inlet 60 and control outlet 54 at the same time that supply inlet seal 66 is withdrawn from bore 72 to establish air pressure communication between supply inlet 46 and control outlet 54. In the leftward position shown, intermediate seal 68 is out of contact with the intermediate bore 74 and permits air pressure to flow from feedback inlet 60 to control outlet 54 through the annular channel formed between control shaft 62 and intermediate bore 74.

In normal operation, control shaft 62 is placed in its rightmost position in the drawing to establish air pressure communication between supply inlet 46 and control outlet 54. The control shaft 62 tends to stay in this position due to the air pressure at control outlet 54 acting on the area of intermediate seal 68. In addition, since the area of shaft seal 70 is greater than the area of intermediate seal 68, any air pressure fed back through feedback inlet 60 between these two seals tends to force the control shaft 62 rightward. Consequently, the rightward position of control shaft 62 is stable and the control shaft 62 remains in that position unless manually displaced.

In the event of a complete loss of air pressure from supply conduit 14, the open pressure communication between supply inlet 46 and control outlet 54 is maintained. This permits the bleeding of air pressure via control line 52 from control inlet 42 of relay valve 38. When the control air pressure is bled off from relay valve 38, the air pressure previously being supplied from reservoirs 24a and/or 24b to the parking brakes, not shown, via parking brake outlet 44 is cut off and the parking brake outlet 44 is exhausted to the atmosphere. This engages the parking brakes.

Engagement of the parking brakes can occur with substantially full stored air pressure in one or both of reservoirs 24a and 24b. Due to the arrangements of the check valves 30a, 30b, 34a and 34b, there is no tendency for either reservoir to exhaust into the other or back to the source. Consequently, air pressure stored in reservoir 24a and/or 24b remains available to manually control the parking brakes as will be explained.

In order to manually release the parking brakes using stored air pressure from reservoirs 24a and 24b, the control shaft 62 is moved fully leftward into the position shown in the drawing. Check valves 58a and 58b select air pressure from whichever of the reservoirs 24a or 24b has the higher air pressure and connects it to feedback inlet 60 of manual control valve 48. The stored pressure available at feedback inlet 60 is connected through the annular passage between control shaft 62 and intermediate bore 74 and via control line 52 to the control inlet 42 of relay valve 38. The presence of stored pressure on control inlet 42 of relay valve 38 operates the relay valve 38 to connect stored air pressure from whichever of reservoirs 24a or 24b has the higher air pressure through parking brake outlet 44 to the parking brakes, not shown.

In the event that one of the air pressure reservoirs 24a or 24b, for example, reservoir 24b, is completely or partially depleted due to a fault in reservoir 24b or in its associated service brakes, release of the parking brakes by the method described in the preceding remains possible whenever sufficient air pressure remains in the other reservoir, for example reservoir 24a. In this event, check valve 58a delivers air pressure to feedback inlet 60 of manual control valve 48 and check valve 34a delivers air pressure from reservoir 24a to pressure inlet 36 of relay valve 38. This permits full manual release of the parking brakes whenever reservoir 24a contains sufficient air pressure, for example, 45 psi or greater.

Figure 3:
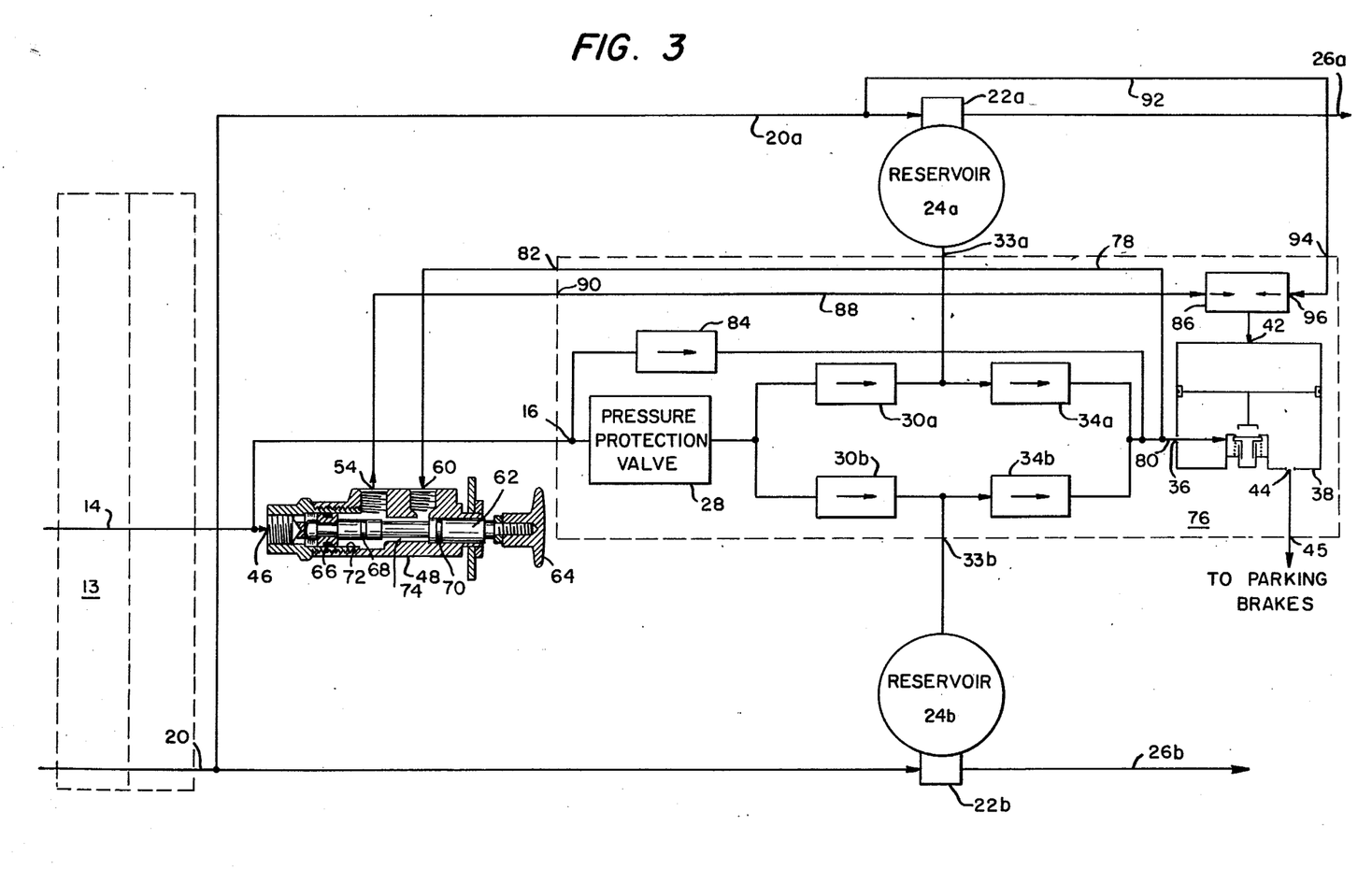
FIG. 3 shows a schematic diagram of a second embodiment of the invention according to the present invention.

A second embodiment of the invention exhibiting an additional improvement over the embodiment previously described is shown in FIG. 3. The valve portion 76, which may be constructed of discrete components or which may be formed in a unitary valve structure, provides a feedback branch 78 which connects the air pressure in conduit 80 through feedback outlet 82 in the valve portion 76 to feedback inlet 60 in manual control valve 48. The pressure in conduit 80 is the higher of the two pressures in reservoirs 24a and 24b as selected by check valves 34a and 34b. Consequently, the air pressure fed back to feedback inlet 60 of manual control valve 48 is the higher of the two stored air pressures. Consequently, during manual operation of the parking brakes, full release is achievable whenever sufficient air pressure remains stored in either of reservoirs 24a or 24b regardless the air pressure in the second reservoir.

A two-way check valve 86 may be interposed in the conduit 88 between inlet 90 of valve portion 76 and control inlet 42 of relay valve 38. A branch conduit 92 from branch 20a of service brake control line 20 is connected via inlet 94 of valve portion 76 to the other inlet 96 of two-way check valve 86. When thus connected, two-way check valve 86 admits to control inlet 42 the higher of the two pressures at its inlets. Consequently, if the air pressure in supply conduit 14 should become severely depleted during a braking action, the air pressure from service brake control line 20 may be employed in relay valve 38 to maintain the parking brakes in the released condition at least until the service brakes have brought the vehicle to a controlled stop. This prevents the dangerous condition of simultaneous actuation of the service and parking brakes during a partial malfunction of the system. Such simultaneous actuation of the service and parking brakes can result in an uncontrolled skid.

In this embodiment, check valves 34a and 34b, besides performing their normal function of selecting the higher of the two stored air pressures for delivery to pressure inlet 36 of relay valve 38, also select the higher of the two air pressures for feedback through feedback outlet 82 to the manual control valve 48. Consequently, the separate check valves required in the feedback path to feedback inlet 60 shown in FIG. 2 are eliminated.

A percharge forward transfer check valve 84 may optionally be provided between supply inlet 16 and conduit 80. The precharge forward transfer check valve 84 bypasses the pressure protection valve 28 and connects air pressure from supply conduit 14 directly to pressure inlet 36 of relay valve 38. During pressurization of the system, and until the air pressure threshold of pressure protection valve 28 is reached, precharge forward transfer check valve 84 permits direct feeding of the low air pressure to the parking brakes under the control of the air pressure at control inlet 42 of relay valve 38. Although the air pressure thus supplied may be insufficient to release the parking brakes, it provides a precharge of air pressure into the parking brakes which permits more rapid release of the parking brakes as the pressure in the system comes up. In addition, if complete failure of both reservoirs 24a, 24b prevents charging the reservoirs, the precharge forward transfer check valve 84 permits partial release of the parking brakes by bypassing the remainder of the system.

The following paragraphs describe a valve portion 76 in a unitary assembly which performs all of the functions described in connection with FIG. 3.

Figure 4:
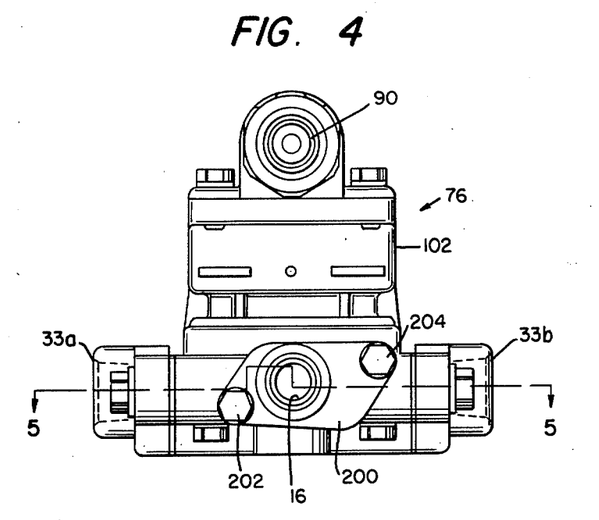
FIG. 4 shows a side elevation of a unitary valve embodying the teaching of the present invention.

In FIG. 4, valve 76 is shown including housing 102 preferably cast of a suitable metal. Also supply inlet 16 and inlet 90 are shown for receiving air from supply conduit 14 and manual control valve 48, respectively. In addition, reservoir ports 33a, 33b are shown for delivering air to and receiving air from reservoirs 24a, 24b.

Figure 5:
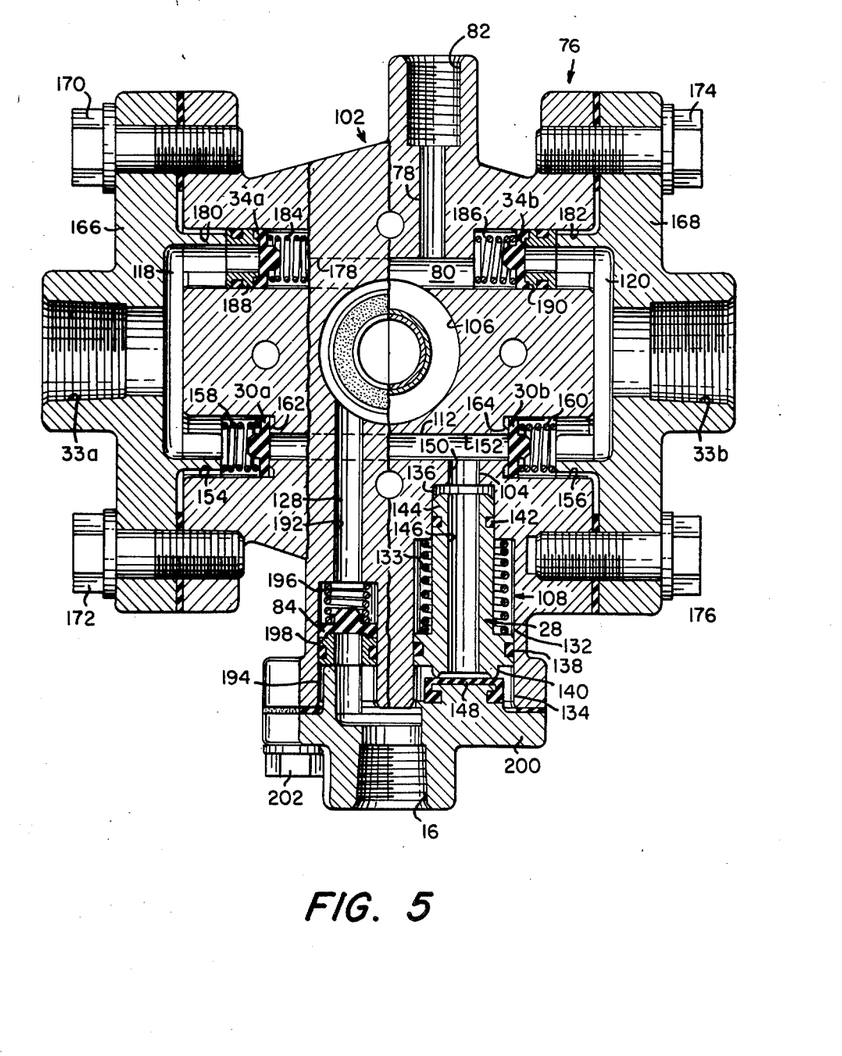
FIG. 5 shows a cross sectional view of the unitary valve taken along 5—5 of FIG. 4.

In FIG. 5, valve 76 includes supply inlet 16 provided in housing 102. A main passage 104 interconnects supply inlet 16 and branch passage 112. The main passage 104 includes a branch passage or portion 108 for accommodating well known pressure protection valve 28. Branch passage 108 intersects branch passage 112 which accommodates inlet check valves 30a, 30b therein. Branch passage 112 intersects branch passages 118, 120 at opposite ends thereof. Reservoir ports 33a, 33b intersect branch passages 118, 120, respectively. Conduit 80 interconnectes branch passages 118, 120 at opposite ends thereof and is provided to accommodate outlet check valves 34a, 34b therein. Also conduit 80 intersects chamber 106. Feedback branch 78 is connected from conduit 80 to feedback outlet 82. Another passage 128 interconnects supply inlet 16 and chamber 106. Passage 128 is provided to accommodate precharge forward transfer check valve 84 therein.

More particularly now, branch passage 108 of main passage 104 interconnects supply inlet 16 and branch passage 112. Branch passage 108 is provided with enlarged annular portion 132, first end 134 and a second end 136. Pressure protection valve 28 is resiliently mounted in portion 132 by spring 133 and is sealingly slidably engaged therein by "O" ring 138 adjacent valve first end 140 and O ring 142 adjacent valve second end 144. Passage 146 is formed through pressure protection valve 28 to permit the passage of fluid therethrough from first end 140 to second end 144. First end 140 sealingly seats against a suitable resilient seal 148 at first end 134 of portion 132. Smaller annular portion 150 of branch passage 108 interconnects portion 132 and branch passage 112. Branch passage 112 includes smaller portion 152 and relatively larger annular portions 154, 156 at opposite ends thereof for accommodating inlet check valves 30a, 30b, respectively. The inlet check valves 30a, 30b are preferably of a resilient material and resiliently mounted in their respective portions 154, 156 by springs 158, 160 for sealingly seating against their respective seats 162, 164. Branch passages 118, 120 interconnect passage 112 and conduit 80 and may, if preferred, be formed when caps 166, 168 are bolted on housing 102 by bolts 170, 172, 174, 176 as shown. Reservoir ports 33a, 33b are provided in caps 166, 168 respectively so as to intersect branch passages 118, 120 and includes smaller portion 178 and relatively larger portions 180, 182 at opposite ends thereof for accommodating outlet check valves 34a, 34b, respectively. The outlet check valves 34a, 34b are similar to inlet check valves 30a, 30b and are preferably of a resilient material and resiliently mounted in their respective portions 180, 182 by springs 184, 186 for sealingly seating against their respective seats 188, 190. Smaller portion 178 intersects chamber 106. Passage 128 interconnects supply inlet 16 and chamber 106 and includes smaller portion 192 and relatively larger portion 194 for accommodating precharge forward transfer check valve 84, similar to outlet check valves 34a, 34b and resiliently mounted in portion 194 by spring 196 for sealingly seating against seat 198. If preferred, supply inlet 16 may be provided in cap 200 which may be bolted to housing 102 by bolts 202, 204 as shown in FIGS. 4 and 5.

Figure 6:
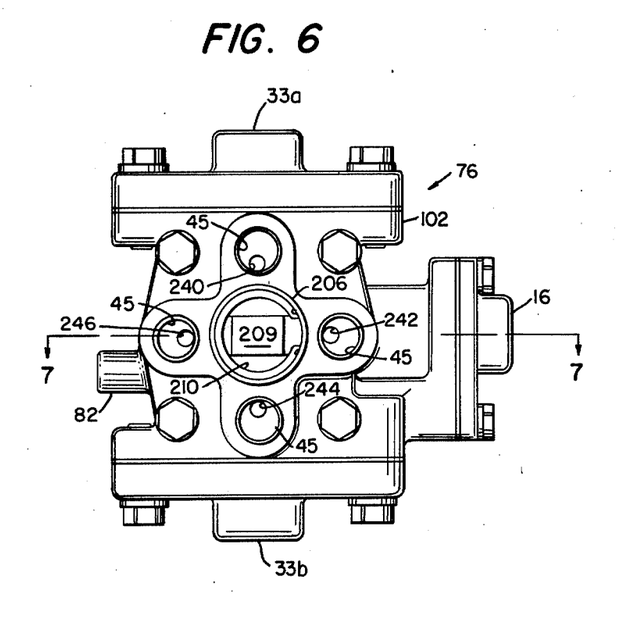
FIG. 6 shows a bottom view of the unitary valve.

FIG. 6 illustrates a bottom view of valve 76 including brake chamber ports 45 and exhaust port 206.

Figure 7:
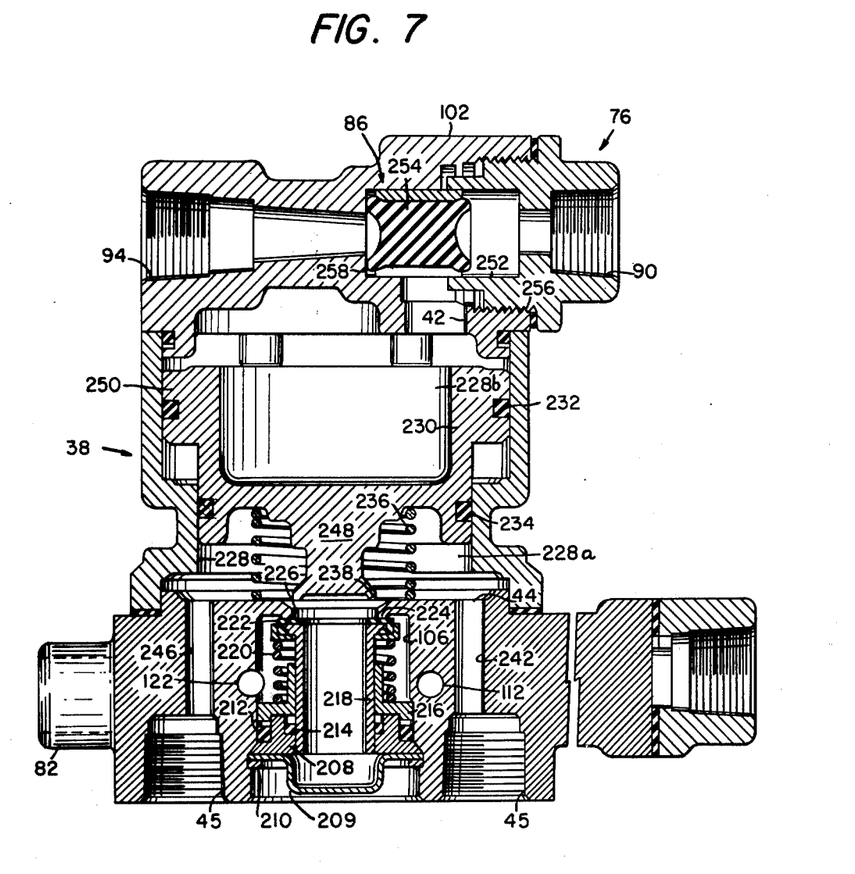
FIG. 7 shows a cross sectional view of the unitary valve taken along 7—7 of FIG. 6.

In FIG. 7, chamber 106 in relay valve 38 is illustrated in greater detail and includes annular member 208 retained therein by exhaust shield 209 and snap-type retainer ring 210. Annular member 208 includes outer annular resilient seal member 212 and inner annular resilient seal member 214. Annular guide member 216 abuts member 208. Valve member 218 is resiliently mounted in chamber 106 due to a resilient member such as spring 220 being seated against guide member 216 and urging valve resilient sealing portion 222 into sealing engagement with seat 224. Valve member 218 is guided to reciprocate in engagement with guide member 216 and in sealing engagement with seal member 214. Conduit 80 is shown intersecting chamber 106. Adjacent seat 224 is reduced diameter passage 226 between chamber 106 and chamber 228. Chamber 228 includes piston 230 sealingly and resiliently mounted therein due to seals 232, 234 and spring 236 urging piston 230 away from chamber 106 to move seat 238 on extended portion 248 of piston 230 out of sealing engagement with resilient valve sealing portion 222. Lower portion 228a of chamber 228 also includes port passages 240, 242, 244, 246 which interconnect that chamber with their respective brake chamber ports 45. Seals 232, 234 sealingly separate the extended portion 248 and upper portion 250 of piston 230 in chamber 228. Inlets 94, 90 enter housing 102 by way of two-way check valve 86 and intersect at enlarged common chamber 252 which accomodates reciprocable sealing member 254 preferably of resilient sealing material and movable in chamber 252 to sealingly seat against either seat 256 at one end adjacent port 90 or against seat 258 at the other end, opposite the one end, adjacent port 94. Upper portion 228b of chamber 228 communicates with common chamber 252 via control inlet 42.

In operation, with the valve 76 assembled as hereinabove described and connected for use in a vehicle braking system as illustrated in FIG. 3, it can be seen that air can be supplied from a tractor (not shown) of a well known tractor trailer combination to the trailer directly to supply inlet 16 and through manual control valve 48 to inlet 90 of valve 76. At a preselected pressure the air entering through supply inlet 16 into passage portion 108 overcomes the seating force of spring 133 and moves pressure protection valve 28 out of sealing engagement with seal 148. This allows air to flow through passage 146 into branch passage 112 past inlet check valves 30a, 30b and into branch passages 118, 120. From passages 118, 120 air is supplied to reservoirs 24a, 24b via respective reservoir ports 33a, 33b and is also supplied to cavity 106 via conduit 80 outlet check valves 34a, 34b. The air entering supply inlet 16 also flows through passage 128 past precharge forward transfer check valve 84 to cavity 106 thus bypassing main passage 104 thus serving as an additional supply of air to cavity 106 for use when sufficient air pressure may not be available from either of the reservoirs 24a, 24b.

Simultaneously, air enters inlet 90 and flows into common chamber 252 urging sealing member 254 into sealing engagement against seat 258. The air then communicates with upper portion 228b of chamber 228 and the upper portion 250 of piston 230, forcing the piston downward. As a result, seat 238 is urged into sealing contact with sealing portion 222 sealing exhaust port 206 and moves valve member 218 downward disengaging seat 224 from sealing portion 222 communicating air pressure between chambers 106 and 228. Air then communicates through passages 240, 242, 244, 246 to their respective brake chamber ports 45 for releasing the vehicle parking brakes.

During normal operation, the vehicle operator stops the vehicle by applying air pressure to the service brake control line 20. This pressure controls well known skid control valves 22a, 22b which take air pressure stored in their respective reservoirs 24a, 24b and apply it to service brakes, not shown, via service brake lines 26a, 26b, respectively. This reduces pressure in the reservoirs and reservoir ports 33a, 33b of valve 76. Check valves 34a, 34b maintain this reduced pressure at ports 33a, 33b from correspondingly reducing the pressure applied to the parking brakes. The application of brake pressure by the vehicle operator to service brake control line 20 also applies air pressure to inlet 94 of valve 76. Under normal conditions this pressure would stop at seat 258 of chamber 252 and be sealed against further communication by sealing member 254 acted upon by an equal or greater pressure applied to the opposite end of the sealing member through inlet 90, as described above. However, should the pressure at inlet 90 be less than the pressure applied at inlet 94, sealing member 254 would move to the right as shown in FIG. 7, thus causing the member to sealingly engage seat 256 thus communicating the air pressure at inlet 94, with the upper portion 250 of piston 230. As a result, the parking brakes will be maintained in the released condition as described above.

To apply the parking brakes, air pressure is exhausted from the upper portion 228b of chamber 228 thus relieving pressure acting on the upper portion 250 of piston 230. This pressure is released via common chamber 252 through either inlet 90 or 94. This permits spring 236 and pressure in lower portion 228b of chamber 228 to urge piston 230 upward into upper portion 228b of chamber 228. As a result, such upward movement of piston 230 causes seat 224 to engage sealing portion 222 thus sealing communication between chambers 106 and 228. Continued upward movement of piston 230 ultimately disengages seat 238 from sealing portion 222 opening exhaust port 206 and permitting air pressure to communicate from the parking brakes through their brake chamber ports 45, passages 240, 242, 244, 246 and through lower chamber portion 228a, to atmosphere via exhaust port 206. Simultaneously pressure is exhausted from passages 112 and 108 through supply inlet 16. However, inlet check valves 30a, 30b and precharge forward transfer check valve 84 prevent the loss of pressure in branch passages 118, 120 and 128, reservoir ports 33a, 33b and their respective reservoirs 24a, 24b.

It will be understood that the claims are intended to cover all changes and modifications of the preferred embodiments to the invention, herein chosen for the purpose of illustration which do not constitute departures from the spirit and scope of the invention.

What is claimed is:

1. A brake control system for a towed vehicle comprising:
    (a) supply pressure means for connecting supply pressure to said towed vehicle;
    (b) valve portion means for supplying said supply pressure to two pressure reservoirs and control means in said valve portion means responsive to said supply pressure for controlling the application of pressure stored in said two reservoirs to a parking brake outlet;
    (c) manual valve means having first and second selectable conditions and first, second and third connections;
    (d) said supply pressure means being connected to said first connection;
    (e) pressure selection means connected to said two pressure reservoirs for selecting pressure from the pressure reservoir having the higher air pressure and securing said pressure from passing to the other pressure reservoir;
    (f) said selected pressure being connected to said second connection;
    (g) said third connection being connected to a control inlet in said control means; and
    (h) said manual valve means being operative in its first condition to interconnect said first and third connections and to block its second connection and in its second condition to interconnect said second and third connections and block said first connection.

2. The brake control system recited in claim 1 further comprising said air pressure selection means being further operative to connect the selected pressure to said control means.

3. The brake control system recited in claim 1 further comprising:
    (a) other pressure selection means in said valve portion connected to said two pressure reservoirs for selecting other pressure from the pressure reservoir having the higher pressure and securing said other pressure from passing to the other pressure reservoir; and (b) the other selected pressure being connected to said control means.

4. The brake control system recited in claim 1 further comprising said pressure selection means being a first check valve connected to said first pressure reservoir, a second check valve connected to said second reservoir and said first and second check valves being connected to said second connection.

5. A brake control system for a towed vehicle comprising:
 (a) supply pressure means for connecting supply pressure to said towed vehicle;
 (b) first and second pressure reservoirs;
 (c) a valve portion comprising:
  (i) a first check valve between said supply pressure means and said first pressure reservoir;
  (ii) a second check valve between said supply pressure means and said second pressure reservoir;
  (iii) a relay valve having first and second inlets and an outlet responsive to pressure at its first inlet to control the metering of pressure between its second inlet and its outlet;
  (iv) a third check valve between said first pressure reservoir and said second inlet;
  (v) a fourth check valve between said second pressure reservoir and said second inlet;
 (d) manual control valve means having a supply inlet, a feedback inlet and a control outlet;
 (e) said supply inlet being connected to said supply pressure means;
 (f) said control outlet being connected to said first inlet;
 (g) pressure selection means for selecting pressure from the one of said first and second pressure reservoirs having the higher pressure and for securing the selected pressure from passing to the other pressure reservoir, the selected pressure being connected to said feedback inlet;
 (h) said manual control valve means having first and second selectable positions; and
 (i) said manual control valve means being operative in its first position for connecting said supply inlet to said control outlet and for blocking said feedback inlet and being further operative in its second position for connecting said feedback inlet to said control outlet and for blocking said supply inlet.

6. The brake control system recited in claim 5 wherein said pressure selection means comprises said third check valve and said fourth check valve.

7. The brake control system recited in claim 5 wherein said pressure selection means comprises:
 (a) a fifth check valve connected from said first pressure reservoir to said feedback inlet; and
 (b) a sixth check valve connected from said second pressure reservoir to said feedback inlet.

8. The brake control system recited in claim 5 further comprising a pressure protection valve between said supply pressure means and said first and second check valves.

9. The brake control system recited in claim 8 further comprising a bypass check valve bypassing said pressure protection valve and said first, second, third and fourth check valves.

10. The brake control system recited in claim 5 wherein said relay valve is an amplifying relay valve.

11. A unitary valve comprising:
 (a) a housing;
 (b) a supply pressure inlet to said housing;
 (c) first and second reservoir ports in said housing;
 (d) a first check valve between said supply pressure inlet and said first reservoir port;
 (e) a second check valve between said supply pressure inlet and said second reservoir port;
 (f) relay valve means in said housing;
 (g) a control inlet in said housing to said relay valve means;
 (h) a pressure inlet to said relay valve means;
 (i) a third check valve between said first reservoir and said pressure inlet;
 (j) a fourth check valve between said second reservoir and said pressure inlet;
 (k) a parking brake outlet in said housing from said relay valve means;
 (l) said relay valve means being operative for connecting pressure from its pressure inlet to its parking brake outlet in response to pressure in its control inlet;
 (m) a feedback outlet in said housing; and
 (n) means for placing said feedback outlet in pressure communication with the pressure at said pressure inlet.

12. The unitary valve recited in claim 11 further comprising a pressure protection valve between said supply pressure inlet and said first and second check valves.

13. The unitary valve recited in claim 12 further comprising a bypass check valve in said housing between said supply pressure inlet and said pressure inlet.

14. The unitary valve recited in claim 11 further comprising said control inlet being an anti-compounding valve in said housing having first and second inlets.

15. A valve for controlling air pressure in a towed vehicle air brake system which system includes a first and a second air supply means for receiving a supply of air for the towed vehicle brake system from an external air supply source, parking brake conduit and service brake conduit, a first and a second air pressure storage means only which supply air pressure to said parking brake conduit and said service brake conduit said valve comprising:
 (a) a first and a second chamber therein;
 (b) first air pressure responsive valve means in said first chamber for sealing and separating a first portion of the first chamber from a second portion thereof;
 (c) second air pressure responsive valve means in said second chamber for normally sealing and separating said second chamber from the second portion of said first chamber;
 (d) inlet air pressure means for connecting air pressure from said first air pressure supply means with said first portion of said first chamber and with said first and second air pressure storage means;
 (e) said inlet air pressure means having first inlet air pressure passage means for connecting air pressure with said first and second storage means;
 (f) third air pressure responsive valve means in said first inlet air pressure passage means for blocking passage of air from said first air pressure supply means at less than a predetermined pressure and for permitting the flow of air at pressure higher than said predetermined pressure;
 (g) first unidirectional check valve means in said first inlet air pressure passage means between said third air pressure responsive valve means and said first and second storage means for preventing air pressure from said first and second storage means from flowing out of said valve and for preventing air pressure in either one of said storage means for flowing into the other;

(h) first oulet air pressure passage means for connecting air pressure from said storage means with said second chamber, said first oulet air pressure passage means having a first branch passage for connecting air pressure from one of the storage means with said first outlet air pressure passage means and a second branch passage for connecting the second one of said storage means with said first oulet air pressure passage means;

(i) second unidirectional check valve means in said first branch passage and third unidirectional check valve means in said second branch passage for preventing the flow of air pressure from either one of the storage means into the other through said first outlet air pressure passage means and for selectively supplying air pressure to said second chamber through said first outlet air pressure passage means from that one storage means which has the higher air pressure and for preventing the selected air from returning to either one of said storage means;

(j) feedback outlet means in said valve connected to said second chamber;

(k) second outlet air pressure passage means for connecting air pressure from said second portion of said first chamber with said parking brake conduit; and (l) said first air pressure responsive valve means in said first chamber and said second air pressure responsive valve means in said second chamber being adapted to engage and connect air pressure from said second chamber to the second portion of said first chamber in response to air pressure in said second chamber and in said first portion of said first chamber and thereby connecting air pressure from the second portion of said first chamber with the parking brake conduit.

* * * * *

UNITED STATES PATENT AND TRADEMARK OFFICE
CERTIFICATE OF CORRECTION

PATENT NO. : 4,169,633
DATED : October 2, 1979
INVENTOR(S) : George Stearns

It is certified that error appears in the above-identified patent and that said Letters Patent are hereby corrected as shown below:

Column 7, line 14: change "percharge" to "precharge"

In the Claims:

Column 13, line 4: change "oulet" to "outlet"

Column 13, line 6: change "oulet" to "outlet"

Column 13, line 11: change "oulet" to "outlet"

Signed and Sealed this

Third Day of February 1981

[SEAL]

Attest:

RENE D. TEGTMEYER

Attesting Officer     Acting Commissioner of Patents and Trademarks